E. DVORAK.
HAND OPERATED LEVER.
APPLICATION FILED NOV. 29, 1919.
1,377,817.
Patented May 10, 1921.
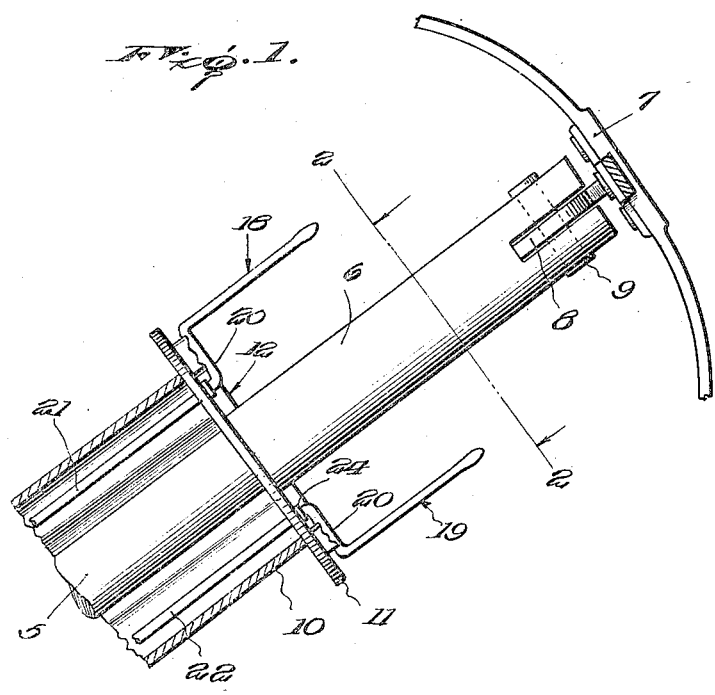
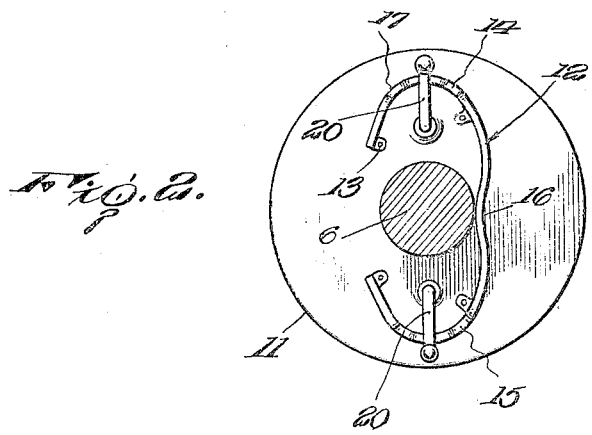
INVENTOR.
Emil Dvorak.
by Lacey & Lacey, Attys

UNITED STATES PATENT OFFICE.

EMIL DVORAK, OF OCHEYEDAN, IOWA.

HAND-OPERATED LEVER.

1,377,817.  Specification of Letters Patent.  Patented May 10, 1921.

Original application filed April 1, 1919, Serial No. 286,645. Divided and this application filed November 29, 1919. Serial No. 341,458.

*To all whom it may concern:*

Be it known that I, EMIL DVORAK, a citizen of the United States, residing at Ocheyedan, in the county of Osceola and State of Iowa, have invented certain new and useful Improvements in Hand-Operated Levers, of which the following is a specification.

This invention relates to improvements in hand operated levers especially adapted for use on motor vehicles and is a division of my co-pending application for patent, filed April 1, 1919, Serial No. 286,645.

An important object of this invention is to provide a lever arrangement for the steering columns of motor vehicles which will permit the steering wheel to be readily moved to a folded or inoperative position when desired.

A further object of the invention is to provide a gas and spark controlling lever arrangement for the steering columns of motor vehicles which, even though arranged at a point considerably below the steering wheel, will not interfere with the free movement of the operator's limbs and which are so arranged that accidental movements of the operator will not operate the levers.

A further object of the invention is to provide a spark and fuel controlling lever mechanism for motor vehicles which is simple, neat in appearance and cheap to manufacture.

In the accompanying drawing forming part of this application and, in which like numerals are employed to designate like parts throughout the same, Figure 1 is a fragmentary side elevation of a steering column having the improved lever arrangement applied thereto, Fig. 2 is a section taken on line 2—2 of Fig. 1.

In the drawing wherein for the purpose of illustration is shown a preferred embodiment of the invention, the numeral 5 designates a steering rod which may be connected to the front wheels of a motor vehicle in any well known manner. The upper portion of the steering rod 5 is enlarged, as indicated at 6, and pivotally supports a steering wheel 7 through the medium of a bracket 8 and a transversely extending pivot pin 9. As set forth in my co-pending application for patent, the steering wheel 7 is adapted to be swung to one side of the steering rod to permit the operator of the vehicle to readily seat himself behind the steering wheel or to permit him to remove himself from behind the steering wheel without interference by the same.

By reason of the pivotal connection between the steering wheel and the steering column or rod the usual gas and spark controlling means above the steering wheel must be dispensed with. During the pivotal movement of the steering wheel the spokes of the same would obviously engage the spark and gas control levers and therefore limit the pivotal movement of the steering wheel.

As set forth in the drawing, the steering rod 5 is surrounded by a casing or sleeve 10 which terminates below the upper end of the steering rod and immediately below the enlarged portion 6 of the same. A disk or head plate 11 is mounted on the steering rod and is confined between the upper end of the casing 10 and the annular shoulder formed by enlarging the upper portion of the steering rod. The disk head is therefore rigidly secured in position and is prevented from rattling as the result of vibration of the vehicle.

With reference to Fig. 2, it will be observed that an elongated strip of relatively narrow metal 12 is mounted on the upper side of the disk 11 and is secured to the same by a plurality of spaced apertured ears 13. The end portions of the elongated strip of metal 12 are curved or bent to provide segments 14 and 15 which are arranged on opposite sides of the steering column. In thus forming the segments, the same serve to mutually brace each other and are thereby enabled to withstand all strain incident to the vibration of the vehicle. The intermediate portion of the elongated strip of metal is bent inwardly, as indicated at 16, into contact with the adjacent side of the steering wheel. The upper sides of the segments 14 and 15 are provided with notches or teeth 17 adapted to be engaged by levers 18 and 19. As illustrated in Fig. 1, the levers 18 and 19 are L-shaped in elevation and are provided with horizontal arms 20 which extend over and engage the segments for securing the levers in adjusted positions. The horizontal portions 20 of the levers 18 and 19 terminate inwardly of the outer edge of the disk or head plate 11 so as to prevent accidental engagement of the operator's limbs with either of the levers. The free end portions of the L-shaped levers extend toward the upper end of the steering rod in spaced parallel relation to the same and are adapted to swing about the longitudinal axis of rods 21 and 22 which are connected by well-known means to the throttle valve and to the commutator of the motor. The upper ends of the rods 21 and 22 extend through bosses 24 provided in the disk. The bosses 24 serve to effectively space the rods 21 and 22 from the casing and the rod 5.

It will be noted that when it is desired to swing the steering wheel to inoperative position, the levers 18 and 19 and the head plate 11 will not interfere with such movement. As previously stated, the head plate 11 extends beyond the horizontal portions 20 of the levers 18 and 19 and thereby prevents the same from being accidentally engaged and moved by the limbs of the operator.

Having thus described the invention, what is claimed is:—

1. The combination with a steering rod having a steering wheel, of a casing surrounding the steering rod and terminating below the upper end of the same, a head plate arranged at the upper end of the said casing and surrounding said steering rod, the upper portion of said steering rod being enlarged thereby forming an annular shoulder in contact with the upper side of said head plate, a plurality of segments mounted on said head plate, and levers associated with said segments.

2. The combination with a steering rod, and a steering wheel pivoted thereto, of an annular disk surrounding the steering rod below its upper end, an elongated strip of metal mounted on said annular disk and provided with attaching means, the end portions of said elongated strip of metal being curved upon themselves and arranged on opposite sides of the steering rod for forming a pair of segments, and levers rotatably mounted in the disk and having lateral portions playing over said segments and terminating inwardly of the periphery of the disk and handle portions rising from said lateral portions parallel with the steering rod.

3. The combination with a steering rod, of a casing surrounding the steering rod and terminating at a point from the upper end of the same, a pair of segments mounted on the upper side of said disk, and a pair of levers associated with said segments and having operating portions arranged inwardly of the periphery of said disk and extending in spaced parallel relation to said steering rod.

In testimony whereof I affix my signature.

EMIL DVORAK. [L. S.]